US011032776B2

(12) United States Patent
Tong et al.

(10) Patent No.: US 11,032,776 B2
(45) Date of Patent: Jun. 8, 2021

(54) BASE STATION AND RADIO TERMINAL (71) Applicant: KYOCERA CORPORATION, Kyoto (JP)

(72) Inventors: Fangwei Tong, Machida (JP); Hiroyuki Urabayashi, Yokohama (JP); Atsuhisa Inakoshi, Yokohama (JP); Chiharu Yamazaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 42 days.

(21) Appl. No.: 16/184,327

(22) Filed: Nov. 8, 2018

(65) Prior Publication Data
US 2019/0098581 A1 Mar. 28, 2019

Related U.S. Application Data (63) Continuation of application No. PCT/JP2017/017345, filed on May 8, 2017.

(30) Foreign Application Priority Data

May 9, 2016 (JP) .............................. JP2016-093980

(51) Int. Cl.
H04W 52/14 (2009.01)
H04W 92/20 (2009.01)
(Continued)

(52) U.S. Cl.
CPC ........ H04W 52/146 (2013.01); H04B 17/102 (2015.01); H04B 17/354 (2015.01);
(Continued)

(58) Field of Classification Search
CPC ... H04B 7/0632; H04B 17/336; H04W 76/28; H04W 52/365; H04W 52/34;
(Continued)

(56) References Cited

U.S. PATENT DOCUMENTS 10,098,130 B2 * 10/2018 Hayashi ................ H04W 16/18
2010/0016010 A1 1/2010 Kashiwase et al.
2013/0231125 A1 9/2013 Jeon et al.
2014/0036822 A1 * 2/2014 Maeda ................ H04B 17/327
370/329

(Continued)

FOREIGN PATENT DOCUMENTS

JP 2008-035290 A 2/2008
JP 2011-077964 A 4/2011
(Continued)

OTHER PUBLICATIONS

3rd Generation Partnership Project; "Technical Specification Group Radio Access Network; Evolved Universal Terrestrial Radio Access (E-UTRA) and Evolved Universal Terrestrial Radio Access Network (E-UTRAN)"; 3GPP TS 36.300 V13.3.0; Mar. 2016; pp. 1-295; Release 13; 3GPP Organizational Partners.

Primary Examiner — Jae Y Lee
Assistant Examiner — Aixa A Guadalupe Cruz
(74) Attorney, Agent, or Firm — Studebaker & Brackett PC (57) ABSTRACT A base station according to one embodiment may comprise a receiver configured to receive first information from a radio terminal, the first information being transmitted based on a measurement result of a reception signal from a neighbouring cell; and a transmitter configured to transmit second information for reducing a transmission power of the radio terminal to the radio terminal when the measurement result of the reception signal from the radio terminal exceeds a threshold value.

10 Claims, 8 Drawing Sheets (51) Int. Cl.
*H04W 24/10* (2009.01)
*H04W 52/24* (2009.01)
*H04B 17/10* (2015.01)
*H04B 17/354* (2015.01)
*H04W 72/04* (2009.01)
*H04W 52/08* (2009.01)
*H04W 52/40* (2009.01)

(52) U.S. Cl.
CPC .......... *H04W 24/10* (2013.01); *H04W 52/24* (2013.01); *H04W 52/241* (2013.01); *H04W 72/0473* (2013.01); *H04W 92/20* (2013.01); *H04W 52/08* (2013.01); *H04W 52/40* (2013.01)

(58) Field of Classification Search
CPC ............ H04W 52/02; H04W 52/0235; H04W 52/0245; H04W 52/06; H04W 52/08; H04W 52/16; H04W 52/24; H04W 52/241; H04W 52/243; H04W 52/38
See application file for complete search history.

(56) References Cited

U.S. PATENT DOCUMENTS

| | | | |
|---|---|---|---|
| 2014/0140323 A1* | 5/2014 | Son .................... | H04W 36/0055 370/331 |
| 2014/0177531 A1* | 6/2014 | Imamura ............. | H04W 52/146 370/328 |
| 2015/0072690 A1* | 3/2015 | Kim ................... | H04W 36/0072 455/437 |
| 2015/0282096 A1* | 10/2015 | Senarath ............. | H04W 52/247 455/522 |
| 2016/0006529 A1* | 1/2016 | Yi .......................... | H04J 11/005 370/329 |
| 2016/0174160 A1* | 6/2016 | Shen ..................... | H04W 52/22 455/522 |
| 2018/0041968 A1* | 2/2018 | Otonari ................ | H04W 52/241 |

FOREIGN PATENT DOCUMENTS

| | | |
|---|---|---|
| JP | 2013-187909 A | 9/2013 |
| WO | 2015/078771 A1 | 6/2015 |

\* cited by examiner

BASE STATION AND RADIO TERMINAL

CROSS-REFERENCE TO RELATED APPLICATION

The present application is a continuation based on PCT Application No. PCT/JP2017/017345 filed on May 8, 2017, which claims the benefit of Japanese Patent Application No. 2016-093980 (filed on May 9, 2016). The content of which is incorporated by reference herein in their entirety.

FIELD

The present disclosure relates to a base station and a radio terminal.

BACKGROUND

In 3GPP (3rd Generation Partnership Project) which is a project aiming to standardize a mobile communication system, an ICIC (Inter-cell Interference Coordination) technology has been introduced to reduce inter-cell interference (see Non Patent Document 1). In the ICIC technology, radio resources used are coordinated among cells to reduce inter-cell interference.

PRIOR ART DOCUMENT

Non-Patent Document

Non Patent Document 1: 3GPP Technical Specification "TS 36.300 V13.3.0" Apr. 1, 2016

SUMMARY

A base station according to one embodiment may comprise a receiver configured to receive first information from a radio terminal, the first information being transmitted based on a measurement result of a reception signal from a neighbouring cell; and a transmitter configured to transmit second information for reducing a transmission power of the radio terminal to the radio terminal when the measurement result of the reception signal from the radio terminal exceeds a threshold value.

A radio terminal according to one embodiment may comprise a transmitter configured to transmit first information to a base station based on a measurement result of a reception signal from a neighbouring cell; a receiver configured to receive, from the base station, second information for reducing a transmission power of the radio terminal; and a controller configured to control the transmission power based on the second information. The second information may be information transmitted when the measurement result of the reception signal from the radio terminal in the base station exceeds a threshold value.

DESCRIPTION OF THE EMBODIMENT

Overview of Embodiment

In the future, as a cell becomes smaller, it is expected that a large number of cells are arranged with high density.

Due to an increased number of cells, a coordination among cells may become complicated. As a result, the existing ICIC technology may not be able to sufficiently reduce inter-cell interference.

A base station according to one embodiment may comprise a receiver configured to receive first information from a radio terminal, the first information being transmitted based on a measurement result of a reception signal from a neighbouring cell; and a transmitter configured to transmit second information for reducing a transmission power of the radio terminal to the radio terminal when the measurement result of the reception signal from the radio terminal exceeds a threshold value.

The transmitter may transmit, to the radio terminal, timer information for measuring a period during which transmission of the first information is restricted.

The receiver may receive, from the radio terminal, third information for the radio terminal to stop controlling the transmission power based on the second information.

The transmitter may transmit the second information to the radio terminal only when interference control information is received from another base station.

The first information may include an identifier indicating the neighbouring cell. The transmitter may transmit the second information to the radio terminal only when the other base station manages the neighbouring cell.

A radio terminal according to one embodiment may comprise a transmitter configured to transmit first information to a base station based on a measurement result of a reception signal from a neighbouring cell; a receiver configured to receive, from the base station, second information for reducing a transmission power of the radio terminal; and a controller configured to control the transmission power based on the second information. The second information may be information transmitted when the measurement result of the reception signal from the radio terminal in the base station exceeds a threshold value.

The receiver may receive timer information for measuring a period during which transmission of the first information is restricted. The transmitter may stop transmitting the first information until the period during which the transmission of the first information is restricted expires.

The controller may stop controlling the transmission power based on the second information when the measurement result of the reception signal from the neighbouring cell is less than a threshold value.

The transmitter may transmit third information when the measurement result of the reception signal from the neighbouring cell is less than a threshold value. The third information may be information for the radio terminal to stop controlling the transmission power based on the second information.

First Embodiment

Mobile Communication System

Figure 1:
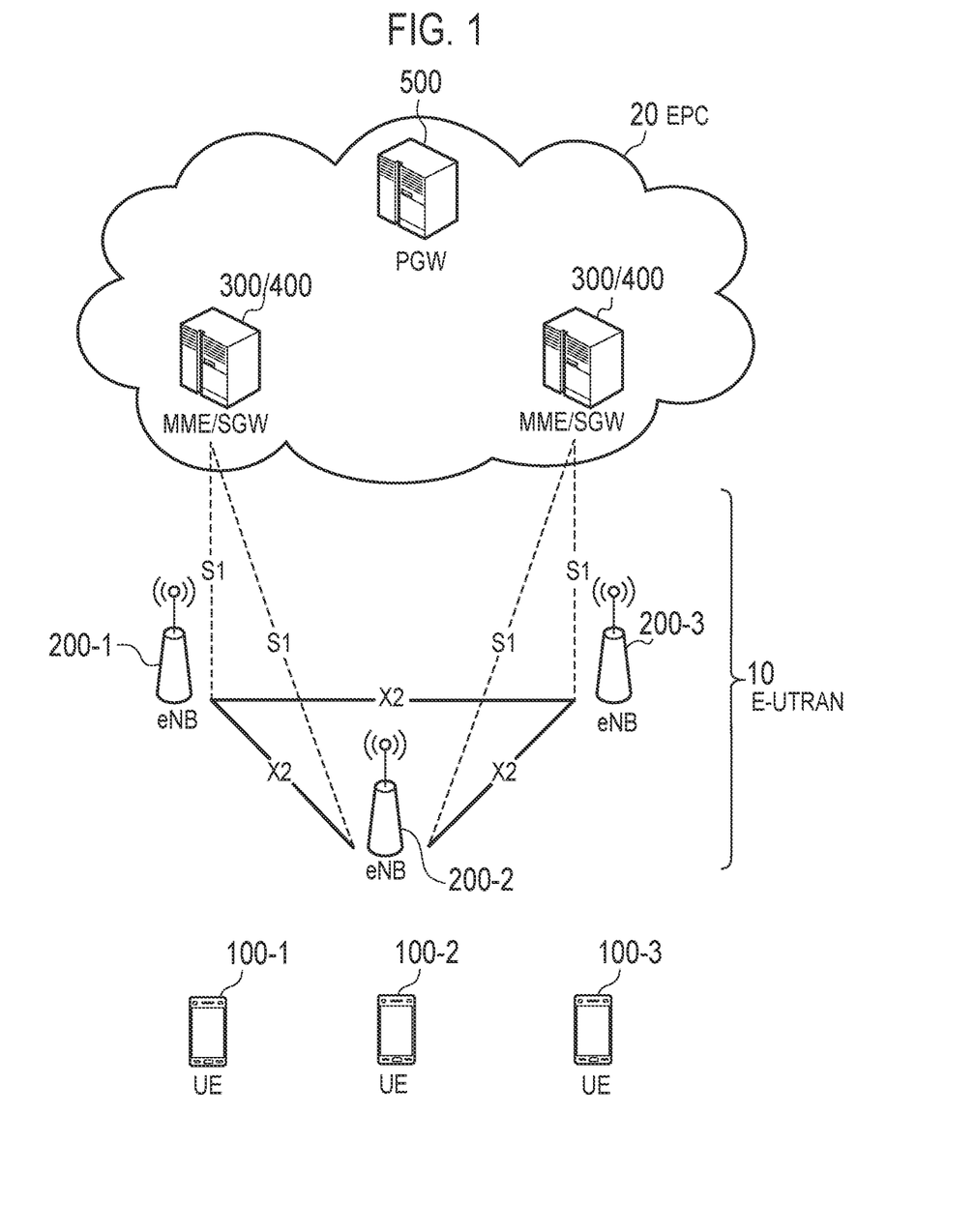
FIG. 1 is a diagram illustrating a configuration of an LTE system.

The configuration of the mobile communication system according to the embodiment will be described. FIG. 1 is a diagram illustrating a configuration of a Long Term Evolution (LTE) system.

As illustrated in FIG. 1, the LTE system includes a User Equipment (UE) 100, an Evolved-Universal Terrestrial Radio Access Network (E-UTRAN) 10, and an Evolved Packet Core (EPC) 20.

The UE 100 corresponds to radio terminal. The UE 100 is a mobile communication apparatus. The UE 100 performs radio communication with a cell (later described eNB 200). The configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. The configuration of the eNB 200 will be described later.

The eNB 200 manages one or a plurality of cells. The eNB 200 performs radio communication with the UE 100 that has established connection with cells managed by the eNB 200. The eNB 200 has a radio resource management (RRM) function, a routing function of user data (hereinafter, simply referred to as "data"), a measurement control function for mobility control and scheduling, and the like. The "cell" is used as a term indicating the minimum unit of a radio communication area. The "cell" is also used as a term indicating a function of performing radio communication with the UE 100.

The EPC 20 corresponds to a core network. The EPC 20 may constitute a network together with the E-UTRAN 10. The EPC 20 includes an MME (Mobility Management Entity) 300, an SGW (Serving Gateway) 400 and a PGW (Packet Data Network Gateway) 500.

The MME 300 performs, for example, various kinds of mobility control for the UE 100. The SGW 400 performs, for example, data transfer control. The MME 300 and the SGW 400 are connected to the eNB 200 via a S1 interface. The PGW 500, for example, performs control of relaying user data from an external network (and to an external network).

Figure 2:
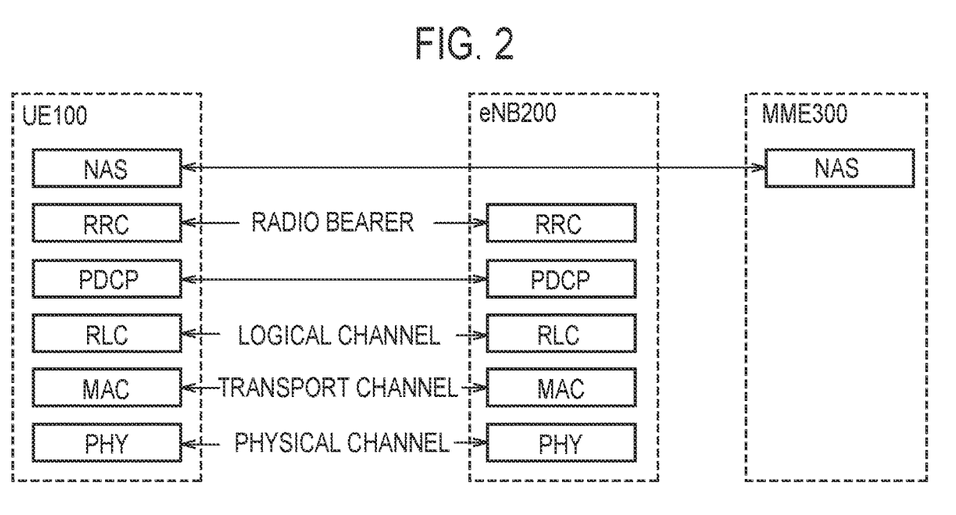
FIG. 2 is a protocol stack diagram of a radio interface in the LTE system.

FIG. 2 is a diagram illustrating protocol stack of a radio interface in the LTE system. As illustrated in FIG. 2, a radio interface protocol is separated into first to third layers of an Open Systems Interconnection (OSI) reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer performs encoding/decoding, modulation/demodulation, antenna mapping/demapping, and resource mapping/demapping. Between the physical layer of the UE 100 and the physical layer of the eNB 200, data and control signal are transferred via a physical channel.

The MAC layer performs data priority control, retransmission processing using a hybrid automatic repeat request (ARQ) (HARQ), a random access procedure, and the like. Between the MAC layer of the UE 100 and the MAC layer of the eNB 200, data and control signal are transferred via a transport channel. The MAC layer of the eNB 200 includes a scheduler (MAC scheduler). The scheduler decides a transport format (transport block size and modulation and coding schemes (MCS)) of uplink and downlink, and a resource block to be allocated to the UE 100.

The RLC layer transfers data to an RLC layer on a reception side using the functions of the MAC layer and the physical layer. Between the RLC layer of the UE 100 and the RLC layer of the eNB 200, data and control information are transferred via a logical channel.

The PDCP layer performs header compression/decompression, and encryption/decryption.

The RRC layer is defined only in a control plane handling control signal. Between the RRC layer of the UE 100 and the RRC layer of the eNB 200, messages (RRC messages) for various configurations are transferred. The RRC layer controls the logical channel, the transport channel, and the physical channel in response to establishment, re-establishment, and release of a radio bearer. If there is connection (RRC connection) between the RRC of the UE 100 and the RRC of the eNB 200, the UE 100 is in an RRC connected state. If there is not a connection (RRC connection) between the RRC of the UE 100 and the RRC of the eNB 200, the UE 100 is in an RRC idle state.

A non-access stratum (NAS) layer located above the RRC layer performs, for example, session management, mobility management, and the like.

Figure 3:
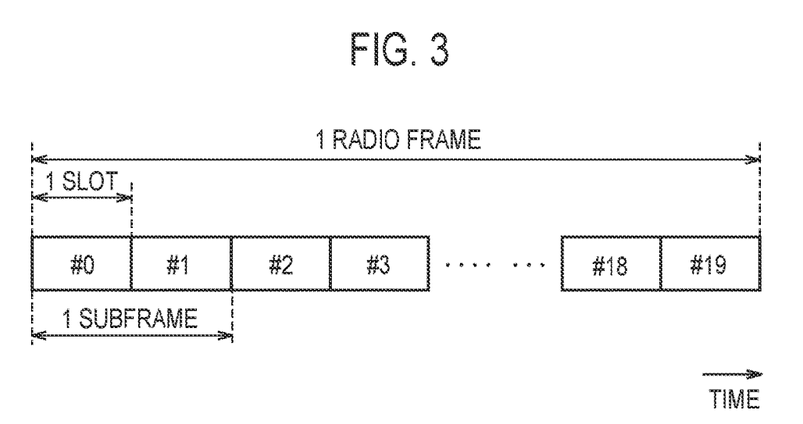
FIG. 3 is a configuration diagram of a radio frame used in the LTE system.

FIG. 3 is a configuration diagram of a radio frame used in the LTE system. In the LTE system, Orthogonal Frequency Division Multiple Access (OFDMA) is applied to downlink. In the LTE system, Single Carrier Frequency Division Multiple Access (SC-FDMA) is applied to uplink.

As illustrated in FIG. 3, a radio frame is constituted by ten subframes arranged in a time direction. Each subframe is constituted by two slots arranged in the time direction. The length of each subframe is 1 ms, and the length of each slot is 0.5 ms. Each subframe includes a plurality of resource blocks (RBs) in a frequency direction. Each subframe includes a plurality of symbols in the time direction. Each resource block includes a plurality of subcarriers in the frequency direction. One resource element (RE) is constituted by one symbol and one subcarrier. Radio resources (time/frequency resources) are allocated to the UE 100. In the frequency direction, radio resources (frequency resources) are constituted by resource blocks. In the time direction, radio resources (time resources) are constituted by subframes (or slots).

In the downlink, the section of the first several symbols of each subframe is an area that can be used as a physical downlink control channel (PDCCH) for transmitting a downlink control signal. The remaining part of each subframe is an area that can be used as a physical downlink shared channel (PDSCH) for transmitting downlink data.

In the uplink, both end portions in the frequency direction in each subframe are areas usable as a Physical Uplink Control Channel (PUCCH) for transmitting an uplink control signal. The remaining part of each subframe is an area that can be used as a physical uplink shared channel (PUSCH) for transmitting uplink data.

Radio Terminal

Figure 4:
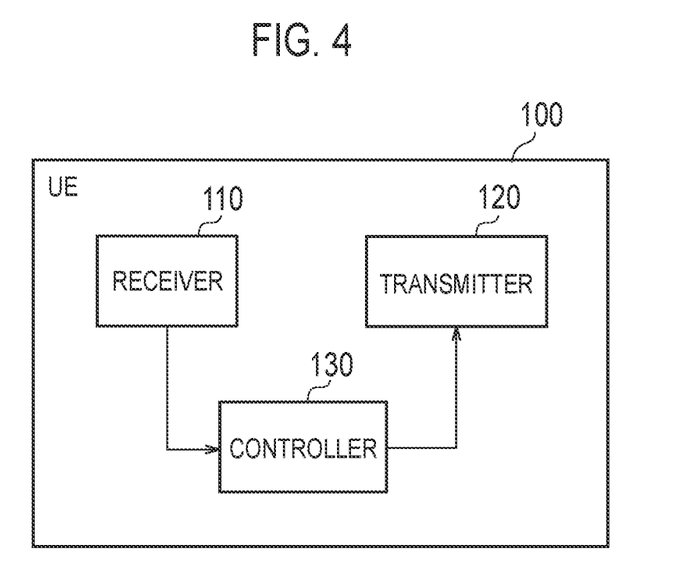
FIG. 4 is a block diagram of a UE 100.

The UE 100 (radio terminal) according to the embodiment will be described. FIG. 4 is a block diagram of the UE 100. As illustrated in FIG. 4, the UE 100 includes a receiver 110, a transmitter 120, and a controller 130. The receiver 110 and the transmitter 120 may be an integrated transceiver.

The receiver 110 performs various types of receptions under the control of the controller 130. The receiver 110 includes an antenna. The receiver 110 converts a radio signal received by the antenna into a baseband signal (reception signal). The receiver 110 outputs the baseband signal to the controller 130.

The transmitter 120 performs various types of transmissions under the control of the controller 130. The transmitter 120 includes an antenna. The transmitter 120 converts the baseband signal (transmission signal) output from the controller 130 into a radio signal. The transmitter 130 transmits the radio signal from the antenna.

The controller 130 performs various types of controls in the UE 100. The controller 130 includes a processor and a memory. The memory stores a program to be executed by the processor, and information to be used for a process by the processor. The processor includes a baseband processor and a CPU (Central Processing Unit). The baseband processor performs, for example, modulation and demodulation, as well as coding and decoding, of the baseband signal. The CPU executes a program stored in the memory to perform various types of processes. The processor may include a codec configured to perform encoding and decoding on sound and video signals. The processor executes various types of processes described later, and various types of communication protocols described above.

The UE 100 may include a GNSS (Global Navigation Satellite System) receiver unit. The GNSS receiver unit can receive a GNSS signal to obtain location information indicating a geographical location of the UE 100. The GNSS receiver unit outputs the GNSS signal to the controller 130. The UE 100 may have a GPS (Global Positioning System) function for acquiring location information of the UE 100.

For simplicity, a process executed by at least any one of the receiver 110, the transmitter 120, and the controller 130 included in the UE 100 is described herein as a process (operation) executed by the UE 100.

Base Station

Figure 5:
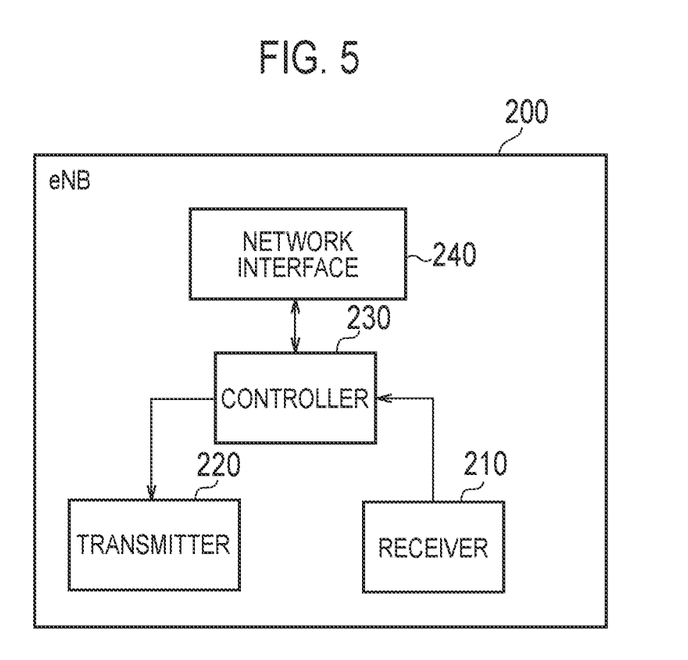
FIG. 5 is a block diagram of an eNB 200.

The eNB 200 (base station) according to the embodiment will be described. FIG. 5 is a block diagram of the eNB 200. As illustrated in FIG. 5, the eNB 200 includes a receiver 210, a transmitter 220, a controller 230, and a network interface 240. The transmitter 210 and the receiver 220 may be an integrated transceiver.

The receiver 210 performs various types of receptions under the control of the controller 230. The receiver 210 includes an antenna. The receiver 210 converts a radio signal received by the antenna into a baseband signal (reception signal). The receiver 210 outputs the baseband signal to the controller 230.

The transmitter 220 performs various types of transmissions under the control of the controller 230. The transmitter 220 includes an antenna. The transmitter 220 converts the baseband signal (transmission signal) output from the controller 230 into a radio signal. The transmitter 220 transmits the radio signal by the antenna.

The controller 230 performs various types of controls in the eNB 200. The controller 230 includes a processor and a memory. The memory stores a program to be executed by the processor, and information to be used for a process by the processor. The processor includes a baseband processor and a CPU. The baseband processor performs modulation and demodulation, coding and decoding, and the like, of the baseband signal. The CPU executes a program stored in the memory to perform various types of processes. The processor executes various types of processes described later, and various types of communication protocols described above.

The network interface 240 is connected to an adjacent eNB 200 via the X2 interface. The network interface 240 is connected to the MME 300 and the SGW 400 via the S1 interface. The network interface 240 is used in communication performed on the X2 interface and communication performed on the S1 interface, for example.

It is noted that for simplicity, a process executed by at least any one of the transmitter 210, the receiver 220, the controller 230, and the network interface 240 included in the eNB 200 is described herein as a process (operation) executed by the eNB 200.

Operation According to Embodiment

Figure 6:
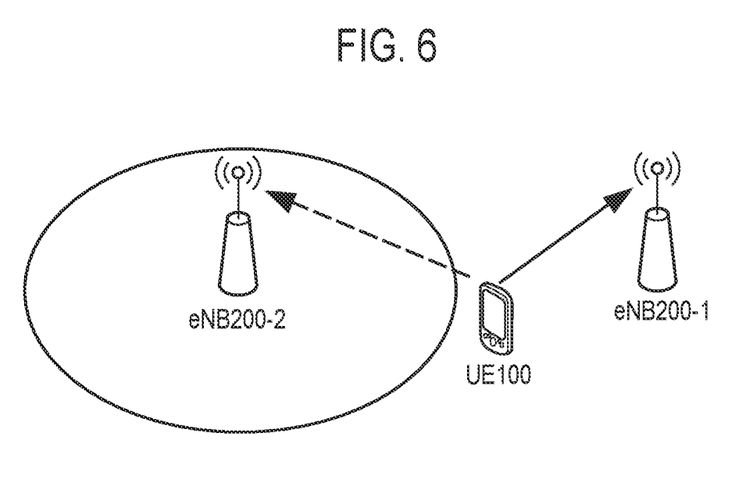
FIG. 6 is a diagram for describing an operation environment according to an embodiment.
Figure 7:
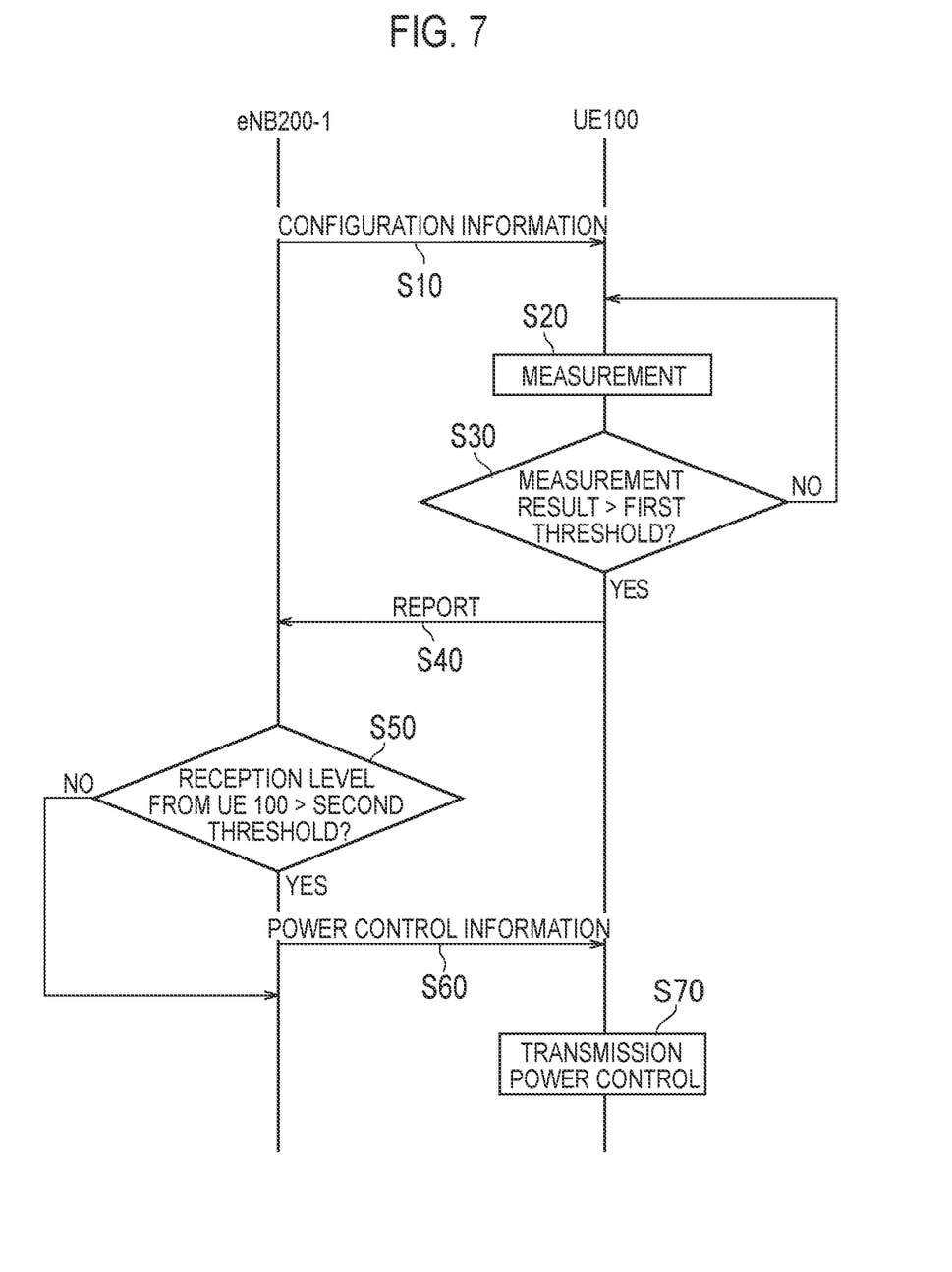
FIG. 7 is a sequence diagram for describing an operation according to the embodiment.
Figure 8:
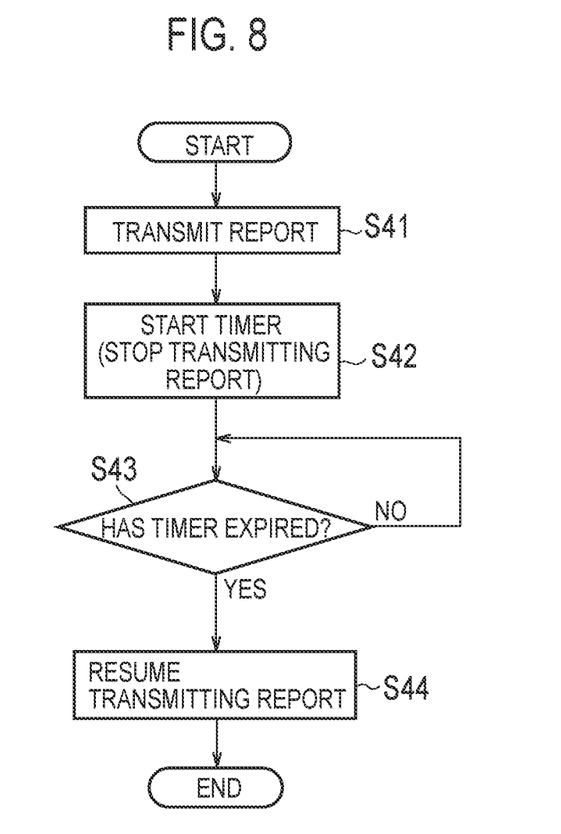
FIG. 8 is a flowchart for describing an operation according to the embodiment.

An operation according to the embodiment will be described with reference to FIG. 6 to FIG. 8. FIG. 6 is a diagram for describing an operation environment according to the embodiment. FIG. 7 is a sequence diagram for describing the operation according to the embodiment. FIG. 8 is a flowchart for describing the operation according to the embodiment.

As illustrated in FIG. 6, the UE 100 exists in a cell managed by an eNB 200-1. The UE 100 may establish a connection with the eNB 200-1. That is, the UE 100 may be in an RRC connected state. The UE 100 may not establish a connection with the eNB 200-1. That is, the UE 100 may be in an RRC idle state.

For an eNB 200-2, a cell managed by the eNB 200-2 adjacent to the eNB 200-1 is adjacent to the cell managed by the eNB 200-1. The cell managed by the eNB 200-1 and/or the eNB 200-2 may be a small cell.

As illustrated in FIG. 7, in step S10, the eNB 200-1 may transmit configuration information (Configuration) to the UE 100. The UE 100 may receive the configuration information from the eNB 200-1.

For example, the eNB 200-1 may transmit the configuration information by broadcast (for example, an SIB: System Information Block). The eNB 200-1 may transmit the configuration information by unicast (for example, an RRC connection reconfiguration message).

The configuration information may include a configuration for the UE 100 to execute a report described later. The configuration information may include, for example, a condition for triggering a report in step S40. For example, the configuration information may include information of a first threshold value described later. The configuration information may include timer information for measuring a period during which transmission of the report is restricted.

The configuration information may be information of a measurement configuration for handover. The configuration information may be information different from the measurement configuration for handover.

In the UE 100, that configuration information may be stored in advance. The UE 100 may execute the operation described later even without receiving the configuration information from the eNB 200-1.

In step S20, the UE 100 executes the measurement. The UE 100 can execute the measurement according to the configuration information from the eNB 200-1.

The UE 100 measures the reception level (hereinafter referred to as an NC reception level) of a reception signal from a neighbouring cell. The UE 100 can measure, as the reception level, for example, a reception power (RSRP: Reference Signal Received Power) and/or a reception quality (RSRQ: Reference Signal Received Quality). The UE 100 may measure the reception level (hereinafter referred to as an SC reception level) of a reception signal from a serving cell. The UE 100 may utilize a measurement result for handover.

In step S30, the UE 100 compares the measurement result with the first threshold value. The UE 100 determines whether or not the measurement result exceeds the first threshold value. For example, the UE 100 may determine whether or not the NC reception level exceeds the first threshold value. That is, the UE 100 may determine whether or not "NC reception level>first threshold value" is satisfied. The UE 100 may determine whether or not "NC reception level—SC reception level" exceeds the first threshold value. That is, the UE 100 may determine whether or not "NC reception level—SC reception level>first threshold value" is satisfied.

The first threshold value may be a fixed value. The first threshold value may be a value to be compared with the NC reception level. The first threshold value may be a value to be compared with a relative reception level. For example, the relative reception level is "NC reception level—SC reception level" (the relative reception level is represented by "dB", for example). Therefore, the UE 100 can compare "NC reception level—SC reception level" with the first threshold value. The first threshold value is a fixed value (for example, −2 dB). In this case, the UE 100 determines whether or not ""NC reception level—SC reception level">first threshold value" is satisfied. The UE 100 may compare the NC reception level with the first threshold value. The first threshold value to be compared with the NC reception level is a value different from the first threshold value to be compared with "NC reception level—SC reception level".

The first threshold value may be the same value as a threshold value used for triggering the measurement report or may be a different value. The first threshold value may be a value smaller than a threshold value used for triggering the measurement report (a value for the report in step S40 before the measurement report).

When "measurement result>first threshold value" is satisfied, the UE 100 executes the process of step S40. When "NC reception level>first threshold value" is not satisfied, the UE 100 does not execute the process of step S40. In this case, when the measurement trigger is satisfied, the UE 100 may execute the process of step S20.

In step S40, the UE 100 transmits the report to the eNB 200-1. The UE 100 transmits the report based on a measurement result of the reception signal from the neighbouring cell.

The report may be a measurement report for handover. The report may be different from the measurement report.

The report may include the measurement result (for example, the range of the RSRP and/or the range of the RSRQ) in step S20. The report may not include the measurement result. The report may include an identifier of a cell to be measured (such as a Cell ID or an ECGI (E-UTRAN Cell Global Identifier)). The UE 100 may include, in the report, an identifier of a neighbouring cell operated by another operator different from an operator of the eNB 200-1. The report does not have to include the identifier of the cell. The report may include information of a measured frequency. The report may not include the information of the measured frequency.

The UE 100 may execute the process in FIG. 8 based on the transmission of the report.

In FIG. 8, after transmitting the report, the UE 100 starts a timer for measuring a period during which transmission of the report is restricted (steps S41 and S42). The timer is a timer for measuring a period (for example, 5 minutes) during which transmission of the report is restricted. The UE 100 can start the timer based on timer information received from the eNB 200-1.

The UE 100 determines whether or not the timer has expired (step S43). When a trigger condition for the report is satisfied, the UE 100 may determine whether or not the timer has expired. When the timer has not expired, the UE 100 stops transmitting the report. That is, the UE 100 stops transmitting the report until the period during which transmission of the report is restricted expires. Thus, the UE 100 need not frequently transmit the report, so that it is possible to suppress consumption of radio resources. The power consumption of the UE 100 can be reduced.

When the timer has not expired, the UE 100 may stop the measurement in S20. Even when the timer has not expired, the UE 100 may continue to use the measurement result for handover.

When the timer has expired, the UE 100 can resume the transmission of the report (step S44). Therefore, when the trigger condition for the report is satisfied after expiration of the timer, the UE 100 can transmit the report.

When the measurement report for handover is triggered, the UE 100 may transmit the measurement report even when the timer has not expired.

In FIG. 7, the eNB 200-1 receives the report. The eNB 200-1 may execute the process of step S50 in response to receiving the report.

In step S50, the eNB 200-1 determines whether or not the measurement result of a reception signal (uplink radio signal) from the UE 100 exceeds a threshold value.

The eNB 200-1 determines whether or not a reception level (hereinafter referred to as a UE reception level) of the reception signal from the UE 100 exceeds a second threshold value. That is, the eNB 200-1 determines whether or not "UE reception level>second threshold value" is satisfied.

The UE reception level is, for example, the reception power of the reception signal (for example, a reference signal) from the UE 100. The UE reception level may be an SINR (Signal to Interference and Noise Ratio). The reception signal from the UE 100 may be a radio signal used for the report in step S40.

The second threshold value is a value equal to or greater than the UE reception level (minimum UE reception level) required for the eNB 200-1 to successfully receive the radio signal from the UE 100. For example, the second threshold value is a value that can secure a communication quality between the eNB 200-1 and the UE 100. For example, the second threshold value is the lowest signal level value for maintaining the MCS that is currently used in communication between the eNB 200-1 and the UE 100. The second threshold value is a value that does not affect the transmission performance of the UE 100. For example, the second threshold value may be −100 dBm. The second threshold value (SINR) may be 3 dB.

The eNB 200-1 can perform the determination based on the UE reception level that can be measured (calculated) by the eNB 200-1. Therefore, even when the report from the UE 100 does not include the measurement result measured by the UE 100, the eNB 200-1 can execute the determination in step S50.

When the UE reception level exceeds the second threshold value, the eNB 200-1 executes the process of step S60. When the UE reception level is equal to or less than the second threshold value, the eNB 200-1 ends the process.

In step S60, the eNB 200-1 transmits power control information to the UE 100. The UE 100 receives the power control information. The eNB 200-1 transmits the power control information by unicast.

The power control information is information for reducing the transmission power of the UE 100. The eNB 200-1 determines the content of the power control information based on a difference between the UE reception level and the second threshold value. For example, the eNB 200-1 may set a power reduction value of the UE 100 to a value (<5 dB) smaller than the difference (for example, 5 dB) between the UE reception level and the second threshold value. That is, the eNB 200-1 determines the contents of the power control information so that the UE reception level after power control is executed is not less than the second threshold value.

The power control information may include a TPC (Transmission Power Control) command for reducing the transmission power of the UE 100. The power control information may include parameters for the power control (for example, target reception power level P0 and path loss correction coefficient α). The parameters include, for example, P0 (P0_UE target reception power level [dBml]) applied individually to each UE. Specifically, the parameters may include a value for lowering P0 currently set in the UE 100. The parameters may include α (path loss correction coefficient). Specifically, the parameters may be a value for lowering α currently set in the UE 100.

For example, the eNB 200-1 can calculate (adjust) a required transmission power (value) of the UE 100. The eNB 200-1 can determine the parameters (P0 and/or α) based on the calculation result. The eNB 200-1 can transmit the power control information including the determined parameters to the UE 100.

In step S70, the UE 100 controls the transmission power based on the power control information. For example, the UE 100 applies the parameters (for example, P0 and/or α) included in the power control information to a calculation formula for the transmission power. The UE 100 executes communication with the eNB 200-1 with the transmission power based on the calculation result. In this way, a transmission power value lower than the current transmission power value is set to the UE 100. As a result, the transmission power (value) of the UE 100 is reduced.

First Modification

Figure 9:
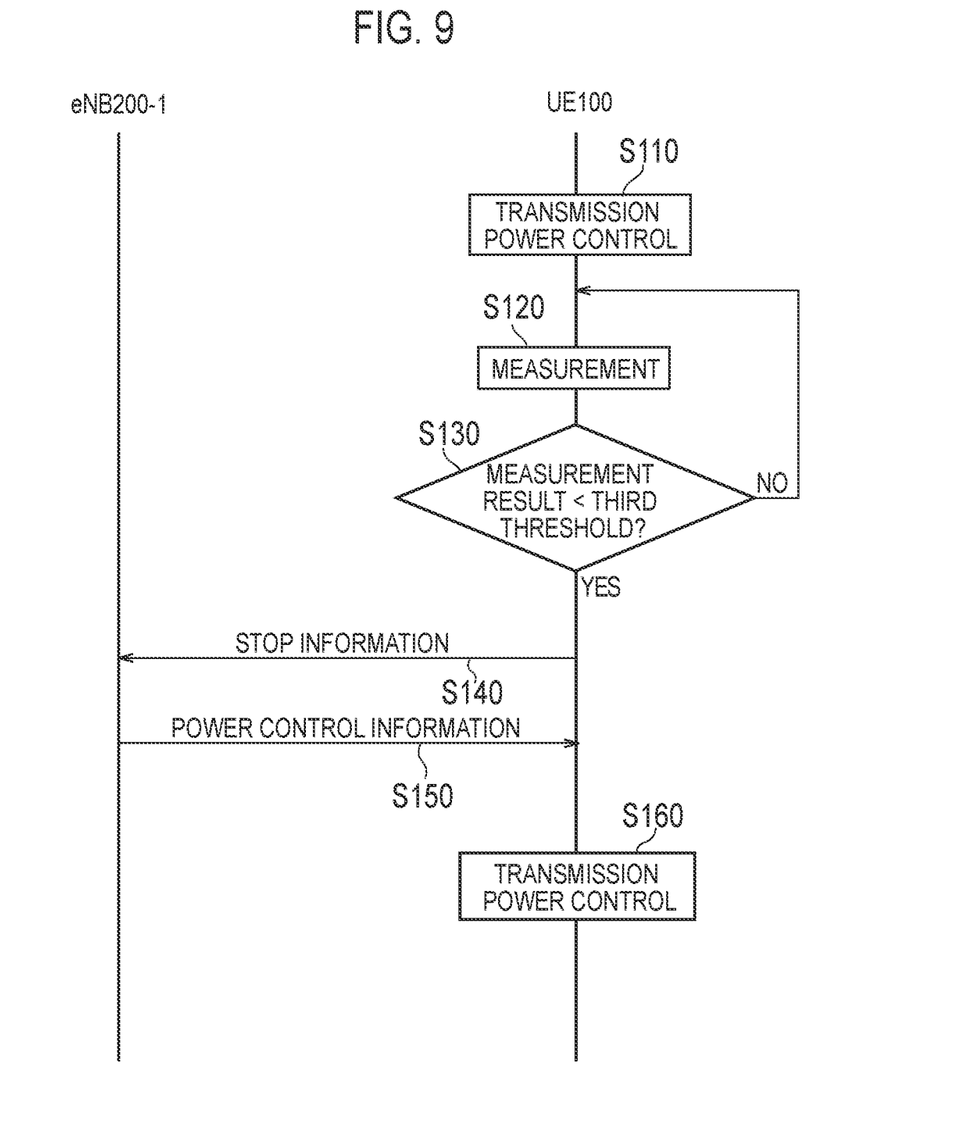
FIG. 9 is a sequence diagram for describing an operation according to a first modification of the embodiment.

A first modification according to the embodiment will be described with reference to FIG. 9. FIG. 9 is a sequence diagram for describing the first modification according to the embodiment.

When receiving the power control information described above, the UE 100 may execute the process in FIG. 9.

Step S110 in FIG. 9 corresponds to S70. Step S120 corresponds to step S20.

In step S130, the UE 100 compares the measurement result with a third threshold value. For example, the UE 100 may determine whether or not the NC reception level is less than the third threshold value. That is, the UE 100 may determine whether or not "NC reception level<third threshold value" is satisfied. The UE 100 may determine whether or not "NC reception level—SC reception level" is less than the third threshold value. That is, the UE 100 may determine whether or not "NC reception level—SC reception level<third threshold value" is satisfied.

The third threshold value may be a fixed value. The third threshold value may be a value to be compared with the NC reception level. The third threshold value may be a value to be compared with a relative reception level.

The third threshold value to be compared with the NC reception level is a value different from the third threshold value to be compared with "NC reception level—SC reception level".

The third threshold value may be the same as the first threshold value. The third threshold value may be different from the first threshold value. For example, when the third threshold is compared with "NC reception level—SC reception level (RSRP)", the third threshold value may be a value smaller than −3 dB, for example.

When "measurement result<third threshold value" is satisfied, the UE 100 can execute the process of step S140. That is, when the UE 100 can determine that the radio signal from the UE 100 does not interfere in another eNB (neighbouring cell), the UE 100 can execute the process of step S140.

When "measurement result<third threshold value" is not satisfied, the UE 100 does not execute the process of step S140. In this case, when the measurement trigger is satisfied, the UE 100 may execute the process of step S120.

In step S140, the UE 100 transmits stop information to the eNB 200-1.

The eNB 200-1 may include, in the power control information (power control information in step S60), information (for example, an indication) indicating that the power control information is special power control information based on the determination in step S50. Only when the indication indicates the power control information based on the determination in step S50, the UE 100 may transmit the stop information to the eNB 200. The UE 100 may execute the operation in step S130 (and/or step S120) according to the indication.

The stop information is information for the UE 100 to stop controlling the transmission power based on the power control information. For example, the stop information may be information for requesting the UE 100 to stop controlling the transmission power based on the power control information in step S60 (i.e., the determination in step S150). The stop information may be the measurement result in step S130. The stop information may be the same information as the report in step S40.

The eNB 200-1 receives the stop information. In response to receiving the stop information, the eNB 200-1 can execute control for returning the transmission power (value) of the UE 100 to a normal value. When the eNB 200-1 has calculated (adjusted) the required transmission power of the UE 100, the eNB 200-1 may include, into the power control information, parameters (target reception power level P0 and/or path loss correction coefficient α) for returning to the normal value. The eNB 200-1 may calculate the required transmission power (value) of the UE 100 for returning to the normal value. The eNB 200-1 may determine the parameters (P0 and/or α) based on the calculation result.

In step S150, the eNB 200-1 can transmit the power control information including the determined parameters to the UE 100.

In step S160, the UE 100 controls the transmission power based on the power control information. Specifically, the UE 100 can execute control for returning the transmission power value to the normal value.

As described above, when the UE reception level of the UE 100 that has transmitted the report exceeds the second threshold value, the eNB 200-1 transmits the power control information for reducing the transmission power, to the UE 100. The UE 100 controls the transmission power based on the power control information. Thus, when the communication quality from the UE 100 to the eNB 200-1 is good, the eNB 200-1 can reduce the transmission power of the UE 100 that is likely to cause interference to another eNB (for example, eNB 200-2) even if not receiving interference control information from the other eNB. It is possible to transmit the power control information only to the UE 100 that may cause interference to a neighbouring cell. As a result, even when complicated control is not executed between cells, inter-cell interference can be reduced.

When the measurement result is less than the threshold value, the UE 100 notifies the eNB 200-1 of the stop information of control of the transmission power. Accordingly, when the UE 100 does not interfere with any neighbouring cell, the UE 100 can transmit an uplink signal with the normal transmission power.

Second Modification

Figure 10:
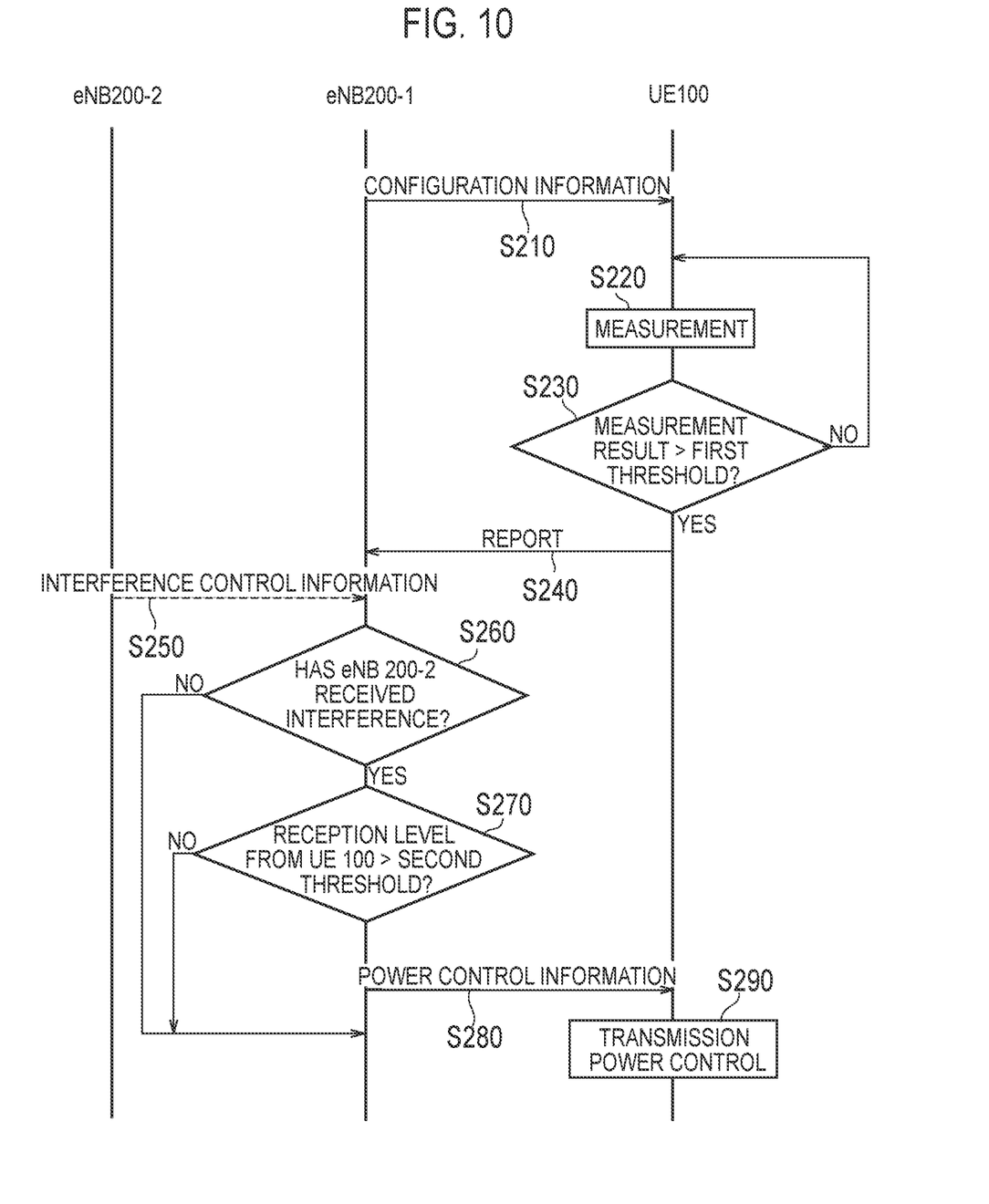
FIG. 10 is a sequence diagram for describing a second modification of the embodiment.

An operation according to a second modification of the embodiment will be described with reference to FIG. 10. FIG. 10 is a sequence diagram for describing the second modification of the embodiment. Description of parts similar to those described above will be omitted where appropriate.

In FIG. 10, steps S210 to S240 correspond to steps S10 to S40.

In step S250, the eNB 200-1 may receive interference control information from the eNB 200-2. The interference control information may include, for example, UL interference overload indication. The UL interference overload indication provides an interference overload report for each physical resource block (PRB).

The eNB 200-1 may transmit the interference control information to the eNB 200-2. The eNB 200-1 may exchange the interference control information with the eNB 200-2. The eNB 200-1 can execute the process of step S260 in response to receiving the interference control information. In response to receiving the interference control information, the eNB 200-1 may omit the process of step S260 and execute the process of step S270.

In step S260, the eNB 200-1 determines, based on the interference control information, whether or not another eNB (the eNB 200-2) has received interference. When determining based on the interference control information that the other eNB (the eNB 200-2) has not received interference, the eNB 200-1 ends the process. Only when determining that the other eNB has received interference, the eNB 200-1 may execute the process of step S270.

The eNB 200-1 may determine a UE 100 to be determined in step S270 based on the interference control information. For example, when the cell identifier included in the report of the UE 100 (the report in step S240) indicates a cell (neighbouring cell) managed by the eNB 200-2 from which the interference control information is transmitted, the eNB 200-1 may determine, as a UE 100 to be determined, the UE 100 from which the report is transmitted.

When the information of a frequency included in the report indicates a frequency by which the eNB 200-2 receives interference, the eNB 200-1 may determine, as a UE 100 to be determined, the UE 100 from which the report is transmitted.

When the UE 100 using a radio resource (a time resource (for example, a subframe)/frequency resource (for example, a physical resource block)) by which the eNB 200-1 receives interference, based on interference information has transmitted the report, the eNB 200-1 may determine, as a UE 100 to be determined, the UE 100.

Steps S270 to S290 correspond to steps S50 to S70. In step S280, when the cell identifier included in the report of the UE 100 does not indicate a cell managed by the eNB 200-1 from which the interference control information is transmitted, the eNB 200-1 may stop transmitting the power control information to that UE 100. Likewise, when the information of the frequency included in the report of the UE 100 does not indicate a frequency operated by the eNB 200-1 from which the interference control information is transmitted, the eNB 200-1 may stop transmitting the power control information to the UE 100.

As described above, when the eNB 200-1 can determine that the UE 100 in the cell of the eNB 200-1 interferes with another eNB, the eNB 200-1 may execute the transmission power control. Thus, it is possible to prevent from executing the transmission power control even though the UE 100 in the cell of the eNB 200-1 does not interfere with another eNB.

Other Embodiments

The contents of the present application are described according to the above-described embodiment, but it should not be understood that the discussion and the drawings constituting a part of this disclosure limit the contents of the present application. From this disclosure, various alternative embodiments, examples, and operational technologies will become apparent to those skilled in the art.

In the above description, the UE 100 may not execute the process in FIG. 8. Accordingly, the UE 100 may transmit the report each time transmission of the report is triggered. Thus, the accuracy of the transmission power control can be increased.

In the above description, the eNB 200-1 may transmit DCI (Downlink Control Information) as the power control information to the UE 100. For example, the eNB 200-1 can transmit the TPC command to the UE 100 using the DCI format for unicast (such as DCI format 0/4 for PUSCH, and DCI format 1 type/2 type for PUCCH). The eNB 200-1 may transmit the TPC command to the UE(s) 100 by using the DCI format for groupcast (DCI format 3/3A). Thus, when all the UE reception levels of a plurality of UEs 100 included in a group exceed the second threshold value, the eNB 200-1 can collectively control the transmission powers of the plurality of UEs 100.

In the above description, the UE 100 may autonomously stop the power control based on the report in S40 (that is, the determination in S50), based on the determination in step S30. That is, the UE 100 may stop the power control without an instruction from the eNB 200-1 (the power control information in step S150).

For example, when receiving the power control information including information (indication) indicating that the power control information is special power control information, the UE 100 may store power settings (the above-described parameters) before receiving that power control information. When the condition (measurement result<third threshold value) in step S130 is satisfied, the UE 100 may execute control for returning the transmission power value to the normal value based on the stored power settings.

The UE 100 may transmit, to the eNB 200-1, stop information indicating that the transmission power value is returned to the normal value (that is, indicating that the transmission power control based on the special power control information is stopped). The UE 100 may execute control for returning the transmission power value to the normal value after transmitting the stop information. Based on the stop information, the eNB 200-1 can grasp that the UE 100 has stopped the transmission power control based on the special power control information.

The stop information may include information (such as the measurement result and the cell identifier) included in the report described above. The eNB 200-1 may determine a method of controlling the transmission power of the UE 100 (for example, determining parameters to be adjusted) based on the information included in the stop information.

The operations according to each of the above-described embodiments may be executed in combination with each other, where appropriate. In each of the above-described sequences, all of the operations may not necessarily be an essential configuration. For example, in each sequence, only some of the operations may be executed.

Although not particularly mentioned in each of the above-described embodiments, a program for causing a computer to execute each process performed by any one of the above-described nodes (including the UE 100 and the eNB 200) may be provided. The program may be recorded on a computer-readable medium. If the computer-readable medium is used, it is possible to install the program in a computer. Here, the computer-readable medium recording therein the program may be a non-transitory recording medium. The non-transitory recording medium may include, but not be limited to, a recording medium such as a CD-ROM and a DVD-ROM, for example.

A chip may be provided which includes: a memory for storing a program for performing each process performed by any one of the UE 100 and the eNB 200; and a processor for executing the program stored in the memory.

In the above-described embodiments, an LTE system is described as an example of the mobile communication system; however, the LTE system is not an exclusive example, and the content according to the present application may be applied to a system other than the LTE system.

The invention claimed is:

1. A base station, comprising:
   a receiver configured to receive first information from a radio terminal, the first information being transmitted based on a measurement result of a first reception signal received by the radio terminal from a neighboring cell;
   a controller configured to determine, in response to receiving the first information, whether a measurement result of a second reception signal exceeds a threshold value, the second reception signal being received by the base station from the radio terminal; and
   a transmitter configured to transmit, to the radio terminal, second information for reducing an uplink transmission power of the radio terminal when the measurement result of the second reception signal exceeds the threshold value.

2. The base station according to claim 1, wherein the transmitter transmits, to the radio terminal, timer information for measuring a period during which transmission of the first information is restricted.

3. The base station according to claim 1, wherein the receiver is further configured to receive, from the radio terminal, third information indicating that the radio terminal stops controlling the uplink transmission power based on the second information.

4. The base station according to claim 1, wherein the transmitter transmits the second information to the radio terminal only when interference control information is received from another base station.

5. The base station according to claim 1, wherein the first information includes an identifier indicating the neighboring cell, and
   the transmitter transmits the second information to the radio terminal only when the other base station manages the neighboring cell.

6. A radio terminal, comprising:
   a transmitter configured to transmit first information to a base station based on a measurement result of a first reception signal received by the radio terminal from a neighboring cell;
   a receiver configured to receive, from the base station, second information for reducing an uplink transmission power of the radio terminal; and
   a controller configured to control the uplink transmission power based on the second information, wherein
   the second information is transmitted when the base station determines, in response to receiving the first information, a measurement result of a second signal exceeds a threshold value, the second signal being received by the base station from the radio terminal.

7. The radio terminal according to claim 6, wherein the receiver receives timer information for measuring a period during which transmission of the first information is restricted, and
   the transmitter stops transmitting the first information until the period during which the transmission of the first information is restricted expires.

8. The radio terminal according to claim 6, wherein the controller stops controlling the transmission power based on the second information when the measurement result of the reception signal from the neighboring cell is less than a threshold value.

9. The radio terminal according to claim 6, wherein the transmitter transmits third information when the measurement result of the reception signal from the neighboring cell is less than a threshold value, and
   the third information is information for the radio terminal to stop controlling the transmission power based on the second information.

10. A communication system comprising a radio terminal and a base station, wherein
    the radio terminal transmits, first information of measurement result of a first reception signal received by the radio terminal from a neighboring cell, to the base station;
    the base station determines, in response to receiving the first information, a measurement result of a second reception signal exceeds a threshold value, the second reception signal being received by the base station from the radio terminal;
    the base station transmits second information for reducing an uplink transmission power of the radio terminal to the radio terminal when the measurement result of the second reception signal exceeds the threshold value;
    the radio terminal controls the uplink transmission power of the radio terminal based on the second information when receiving the second information for reducing the uplink transmission power of the radio terminal;
    the base station receives, from the radio terminal, third information for the radio terminal to stop controlling the uplink transmission power based on the second information.

* * * * *